(12) United States Patent
Alex

(10) Patent No.: US 8,897,103 B2
(45) Date of Patent: Nov. 25, 2014

(54) DISK DRIVE CALIBRATING A LASER WRITE POWER FOR HEAT ASSISTED MAGNETIC RECORDING

(75) Inventor: Michael Alex, Fremont, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 233 days.

(21) Appl. No.: 13/246,685

(22) Filed: Sep. 27, 2011

(65) Prior Publication Data

US 2013/0077453 A1 Mar. 28, 2013

(51) Int. Cl.
| | | |
|---|---|---|
| G11B 11/00 | (2006.01) | |
| G11B 5/455 | (2006.01) | |
| G11B 5/02 | (2006.01) | |
| G11B 5/00 | (2006.01) | |

(52) U.S. Cl.
CPC .......... *G11B 5/02* (2013.01); *G11B 2005/0021* (2013.01); *G11B 5/455* (2013.01)
USPC ...................................... 369/13.26

(58) Field of Classification Search
None
See application file for complete search history.

(56) References Cited

U.S. PATENT DOCUMENTS

| | | | |
|---|---|---|---|
| 5,392,273 A | | 2/1995 | Masaki et al. |
| 5,602,814 A | * | 2/1997 | Jaquette et al. ............ 369/47.53 |
| 5,805,559 A | | 9/1998 | Murakami et al. |
| 6,046,970 A | | 4/2000 | DeCusatis et al. |
| 6,359,433 B1 | | 3/2002 | Gillis et al. |
| 6,671,232 B1 | * | 12/2003 | Stupp .......................... 369/13.02 |
| 6,703,677 B2 | | 3/2004 | Lee et al. |
| 6,744,582 B2 | | 6/2004 | Shimoda et al. |
| 6,747,257 B1 | | 6/2004 | Farnsworth et al. |
| 6,771,440 B2 | | 8/2004 | Smith |
| 6,858,871 B2 | | 2/2005 | Okada |
| 6,982,843 B2 | | 1/2006 | Coffey et al. |
| 7,095,577 B1 | | 8/2006 | Codilian et al. |
| 7,161,882 B2 | | 1/2007 | Lehr et al. |
| 7,177,253 B2 | | 2/2007 | Ishibashi et al. |
| 7,310,206 B2 | | 12/2007 | Liu et al. |
| 7,480,214 B2 | | 1/2009 | Challener et al. |
| 7,688,689 B2 | | 3/2010 | Gage et al. |
| 7,710,686 B2 | | 5/2010 | Kim et al. |
| 7,724,470 B2 | | 5/2010 | Poon et al. |
| 7,876,655 B2 | | 1/2011 | Sasaki |
| 7,898,759 B2 | | 3/2011 | Matsumoto et al. |
| 7,940,486 B2 | | 5/2011 | Shimazawa et al. |
| 8,023,226 B2 | | 9/2011 | Shimazawa et al. |
| 2002/0136115 A1 | | 9/2002 | Kadlec et al. |
| 2006/0005216 A1 | | 1/2006 | Rausch |
| 2006/0233061 A1 | | 10/2006 | Rausch et al. |

(Continued)

OTHER PUBLICATIONS

Lawrence A. Johnson, "Accelerated Aging Test of 1310 nm Laser Diodes", ILX Lightwave Application Note #29, May 31, 2006, http://www.ilxlightwave.com/appnotes/AN%2029%20REV01%20Accelerated%20Aging%20Test%20of%201310nm%20LD.pdf.

(Continued)

*Primary Examiner* — Joseph Feild
*Assistant Examiner* — Parul Gupta

(57) ABSTRACT

A disk drive is disclosed comprising a head actuated over a disk, wherein the head comprises a laser for heating the disk while writing data to the disk. The disk drive receives write commands, and increases a power of the laser to a write power for heating the disk while writing data to the disk. A calibration interval is adjusted based on the power applied to the laser over time, and the write power is calibrated at the calibration interval.

20 Claims, 7 Drawing Sheets

(56) References Cited

U.S. PATENT DOCUMENTS

| | | |
|---|---|---|
| 2007/0014041 A1 | 1/2007 | Lille et al. |
| 2007/0081427 A1 | 4/2007 | Suh et al. |
| 2008/0158730 A1 | 7/2008 | Furukawa et al. |
| 2008/0204916 A1 | 8/2008 | Matsumoto et al. |
| 2008/0316872 A1 | 12/2008 | Shimizu et al. |
| 2009/0040645 A1 | 2/2009 | Shimazawa et al. |
| 2009/0059411 A1 | 3/2009 | Tanaka et al. |
| 2009/0225464 A1 | 9/2009 | Juang et al. |
| 2009/0303629 A1 | 12/2009 | Nakano et al. |
| 2010/0208378 A1 | 8/2010 | Seigler et al. |
| 2010/0208391 A1 | 8/2010 | Gokemeijer |
| 2011/0228416 A1 | 9/2011 | Sasaki et al. |
| 2012/0051196 A1 | 3/2012 | Grobis et al. |
| 2012/0201108 A1 | 8/2012 | Zheng et al. |

OTHER PUBLICATIONS

Patrick Gale, "Estimating Laser Diode Lifetimes and Activation Energy", ILX Lightwave Application Note 33, 2008, http://www.ilxlightwave.com/appnotes/AN%2033%20REV01%20Estimating%20Laser%20Diode%20Lifetimes%20&%20Activation%20Energy.pdf.

* cited by examiner

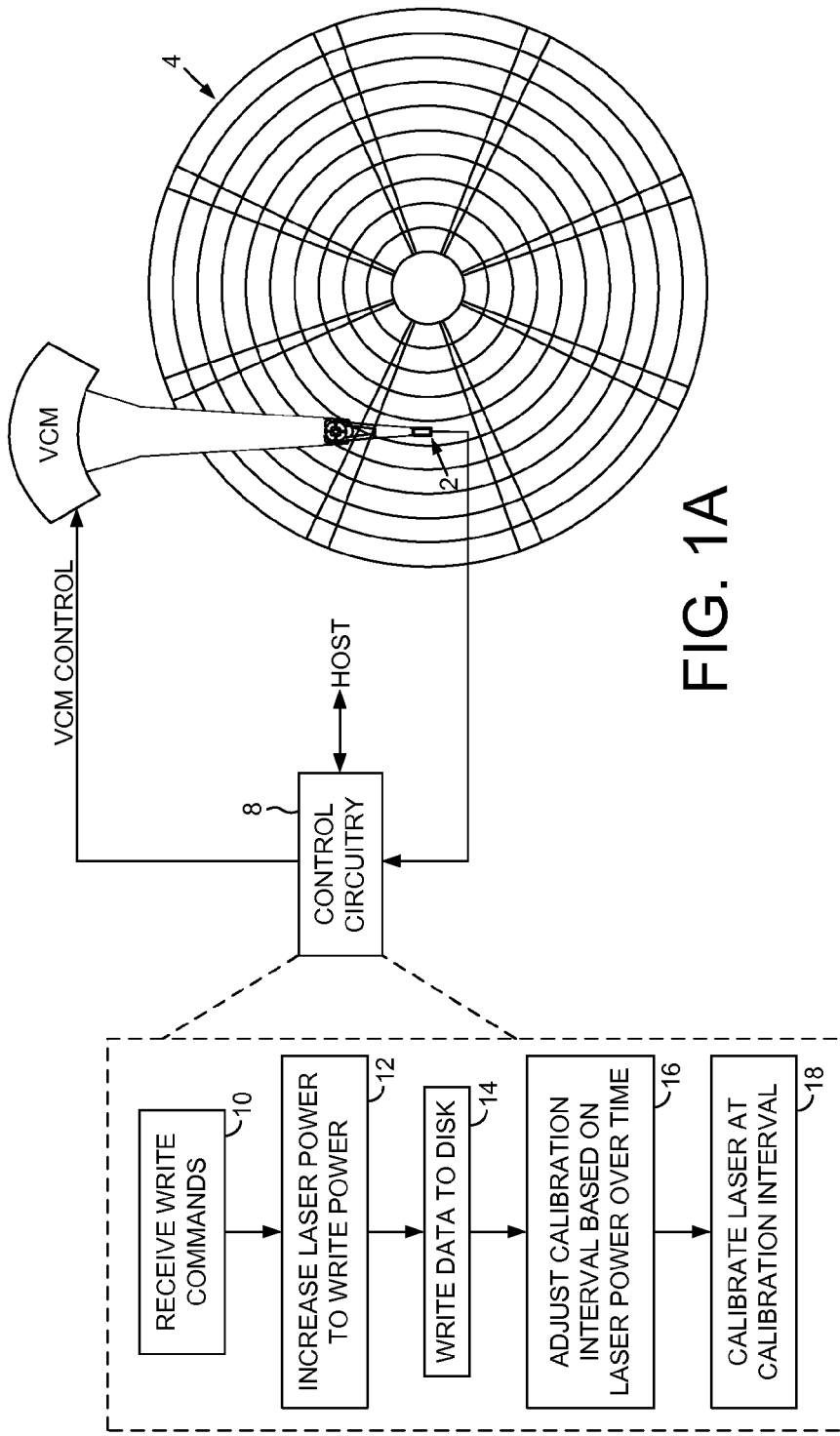
FIG. 1A
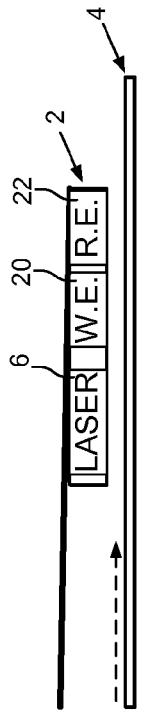
FIG. 1B
FIG. 1C $B\_QM = QM \cdot (K/CALIBRATION\_TIMER)$

DISK DRIVE CALIBRATING A LASER WRITE POWER FOR HEAT ASSISTED MAGNETIC RECORDING

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

Data is typically written to the disk by modulating a write current in an inductive coil to record magnetic transitions onto the disk surface in a process referred to as saturation recording. During readback, the magnetic transitions are sensed by a read element (e.g., a magnetoresistive element) and the resulting read signal demodulated by a suitable read channel. Heat assisted magnetic recording (HAMR) is a recent development that improves the quality of written data by heating the disk surface during write operations in order to decrease the coercivity of the magnetic medium, thereby enabling the magnetic field generated by the write coil to more readily magnetize the disk surface.

BRIEF DESCRIPTION OF THE DRAWINGS

FIG. 1A shows a disk drive according to an embodiment of the present invention comprising a head actuated over a disk.

FIG. 1B shows a head according to an embodiment of the present invention comprising a laser for heating the disk while writing data to the disk.

FIG. 1C is a flow diagram according to an embodiment of the present invention wherein a calibration interval for the laser is adjusted based on the laser power over time.

DETAILED DESCRIPTION OF EMBODIMENTS OF THE INVENTION

Figure 2A:
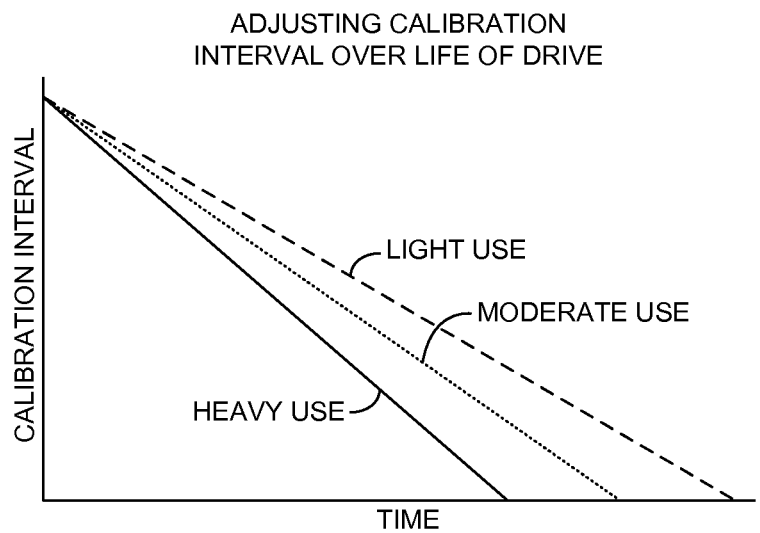
FIG. 2A shows an embodiment wherein the calibration interval decreases at different rates over time depending on the level of use.

FIG. 1A shows a disk drive according to an embodiment of the present invention comprising a head 2 actuated over a disk 4. The head 2 (FIG. 1B) comprises a laser 6 for heating the disk 4 while writing data to the disk 4. The disk drive further comprises control circuitry 8 operable to execute the flow diagram of FIG. 1C, wherein write commands are received (step 10), and a power of the laser is increased to a write power (step 12) for heating the disk while writing data to the disk (step 14). A calibration interval is adjusted based on the power applied to the laser over time (step 16), and the write power is calibrated at the calibration interval (step 18).

Any suitable laser 6 may be employed in the embodiments of the present invention, such as a laser diode. In addition, embodiments of the present invention may employ any suitable techniques for focusing the laser on the disk, such as a suitable waveguide, magnifying lense, or other suitable optics. Also in the embodiment of FIG. 1B, the head 2 comprises a write element 20 (e.g., an inductive coil) and a read element 22 (e.g., a magnetoresistive read element). During write operations the power applied to the laser 6 is increased to a write power in order to heat the disk, thereby decreasing the coercivity so that the data is written more reliably. The write power is calibrated periodically to ensure optimal heating over the life of the disk drive, and because the laser's output degrades over time, in the embodiments of the present invention the calibration interval is adjusted based on the power applied to the laser over time.

This is illustrated in FIG. 2A wherein over the life of the disk drive the calibration interval for calibrating the write power of the laser decreases to account for the degradation of the laser over time. The speed at which the calibration interval decreases depends on the level of use (frequency of write operations) during the life of the disk drive, wherein the calibration interval decreases faster as the level of use increases. That is, an increasing frequency of write operations causes a faster degradation of the laser, and therefore the calibration interval is decreased at a faster rate to ensure an optimal write power is maintained. In one embodiment, the calibration interval is decreased to a minimum value rather than to zero as illustrated in FIG. 2A. The example of FIG. 2A assumes a constant level of use over time and therefore a linear reduction in the calibration interval over time, whereas the actual reduction rate may vary over time as the level of use varies over time.

Figure 2B:
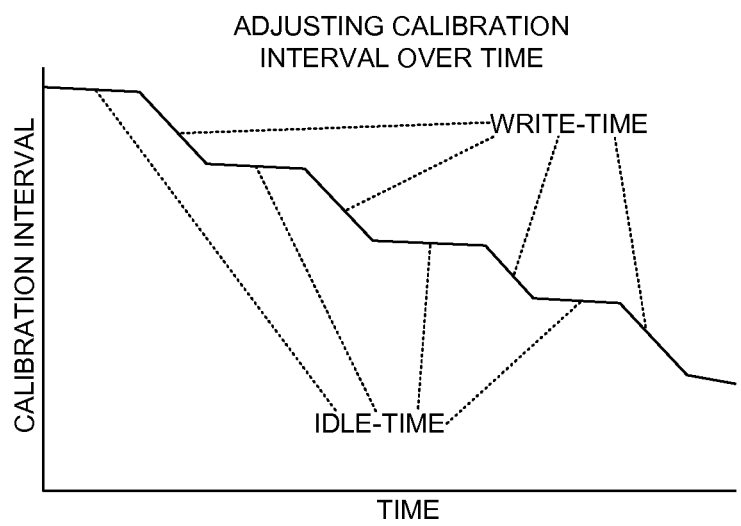
FIG. 2B shows an embodiment wherein the calibration interval decreases at a faster rate when writing data to the disk.

FIG. 2B illustrates an embodiment of the present invention wherein the calibration interval decreases faster during write times when the laser power is high and decreases slower during idle times when the laser power is lower or off. In one embodiment, the laser power may be turned off during idle times, and in another embodiment the laser power may be reduced to a standby level during idle times. In yet another embodiment, the laser power may be increased during a pre-heat interval prior to writing data to the disk, wherein the pre-heat power may be the same as or less than the write power. In the embodiments of the present invention, the power applied to the laser is tracked over time and the calibration interval adjusted accordingly.

Figure 3A:
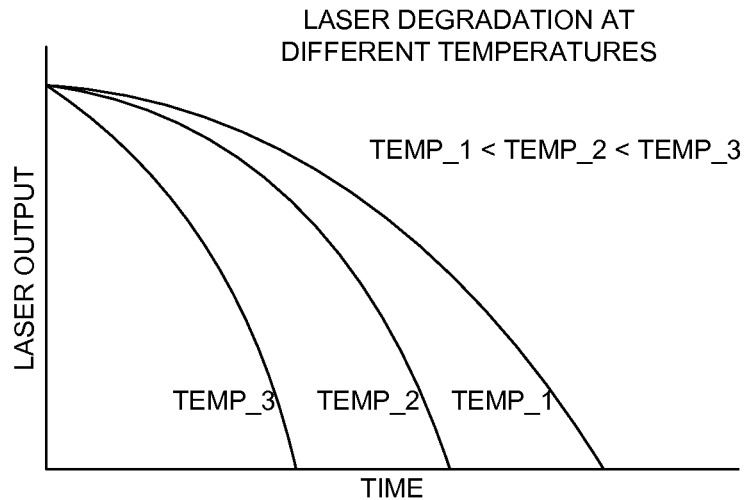
FIG. 3A shows how the laser degrades at different rates for different ambient temperatures.
Figure 3B:
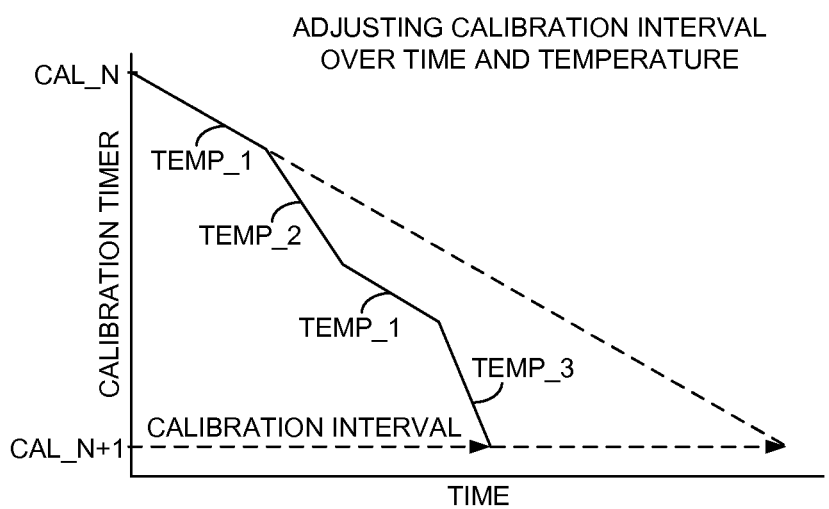
FIG. 3B shows an embodiment of the present invention wherein the calibration interval is adjusted based on the ambient temperature.

FIGS. 3A and 3B illustrate an embodiment of the present invention wherein the laser output degrades over time at different rates based on the ambient temperature. In the example shown in FIG. 3A, the laser output degrades faster as the ambient temperature increases, wherein each curve shown in FIG. 3A assumes a constant laser power and a constant ambient temperature over time. To account for the varying degradation speed, in an embodiment illustrated in FIG. 3B a calibration timer that times the calibration interval is adjusted based on the ambient temperature over the calibration interval. In effect, the calibration interval is adjusted based on the ambient temperature, wherein in the example of FIG. 3B the calibration interval is decreased due to the ambient temperature increasing at various intervals. The example of FIG. 3B shows a significant reduction of a current calibration interval based on the ambient temperature, whereas in practice the calibration interval may change by a much smaller amount due to fluctuations in ambient temperature.

Figure 4A:
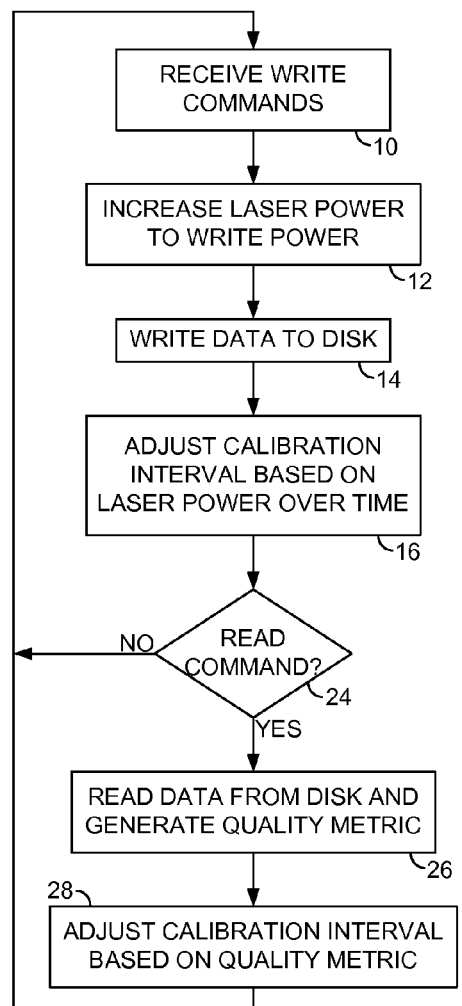
FIG. 4A is a flow diagram according to an embodiment of the present invention wherein the calibration interval is adjusted based on a quality metric generated during a read operation.
Figure 4B:
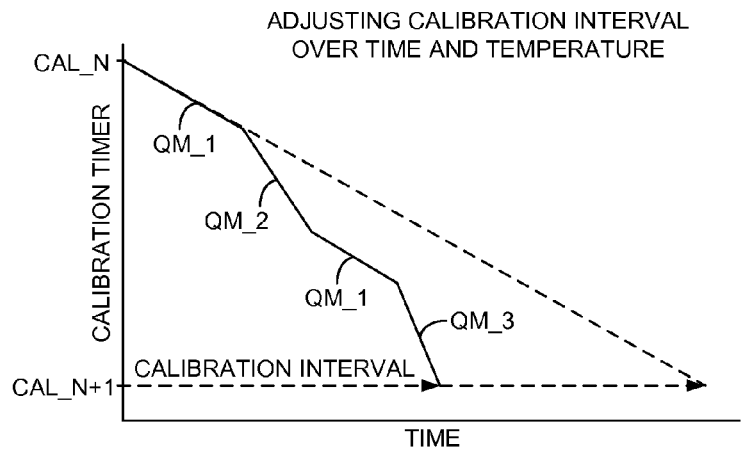
FIG. 4B illustrates the calibration interval being adjusted based on the quality metric according to an embodiment of the present invention.

FIG. 4A is a flow diagram according to an embodiment of the present invention which extends on the flow diagram of FIG. 1C, wherein when a read command is received (step 24), data is read from the disk and a corresponding quality metric is generated (step 26). The calibration interval for the laser write power is then adjusted based on the quality metric. In an example illustrated in FIG. 4B, a calibration timer may be adjusted during a calibration interval as the quality metric changes, thereby adjusting the calibration interval. For example, if the quality metric indicates the quality of the recorded data is degrading, the calibration interval is decreased so that the laser write power is recalibrated sooner. Any suitable quality metric may be generated while reading data from the disk, such as a bit error rate or any suitable read channel quality metric (e.g., read signal amplitude, gain control setting, timing recovery metric, sequence detector metric, etc.).

Figures 5A, 5B:
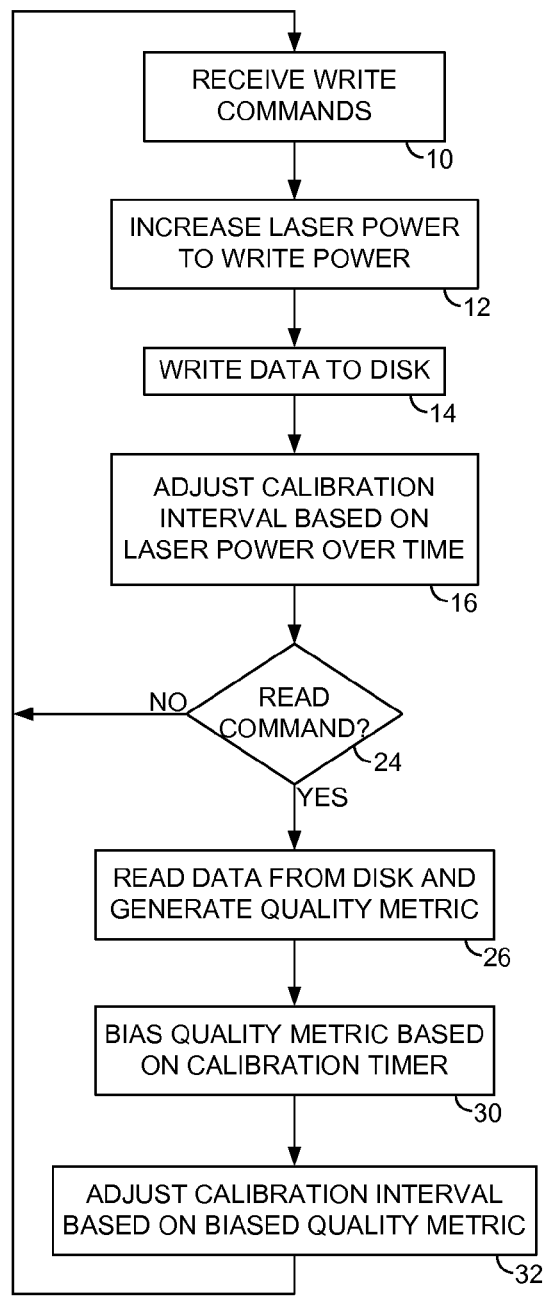
FIG. 5A is a flow diagram according to an embodiment of the present invention wherein the quality metric is biased based on a calibration timer for timing the calibration interval.
FIG. 5B shows an example of how the quality metric may be biased according to an embodiment of the present invention.

FIG. 5A is a flow diagram according to an embodiment of the present invention which extends on the flow diagram of FIG. 4A wherein the quality metric generated during a read operation (step 26) is biased based on a calibration timer for timing the calibration interval (step 30). The calibration interval is then adjusted based on the biased quality metric (step 32). For example, if the quality metric indicates the recording quality is degrading soon after calibrating the laser write power, it is more likely that the problem is due to something other than the laser write power. Therefore, the control circuitry may attempt to recalibrate a different component (e.g., write current amplitude, or a read channel component) rather than attempting to recalibrate the laser write power again. However if the quality metric is degrading near the end of the calibration interval, it is more likely caused by an incorrect laser write power. Therefore the calibration interval is decreased so that the laser write power is calibrated sooner. The quality metric may be biased using any suitable algorithm, wherein FIG. 5B shows an example where the quality metric is multiplied by a scalar K divided by a calibration timer that is decremented over time.

Figure 6:
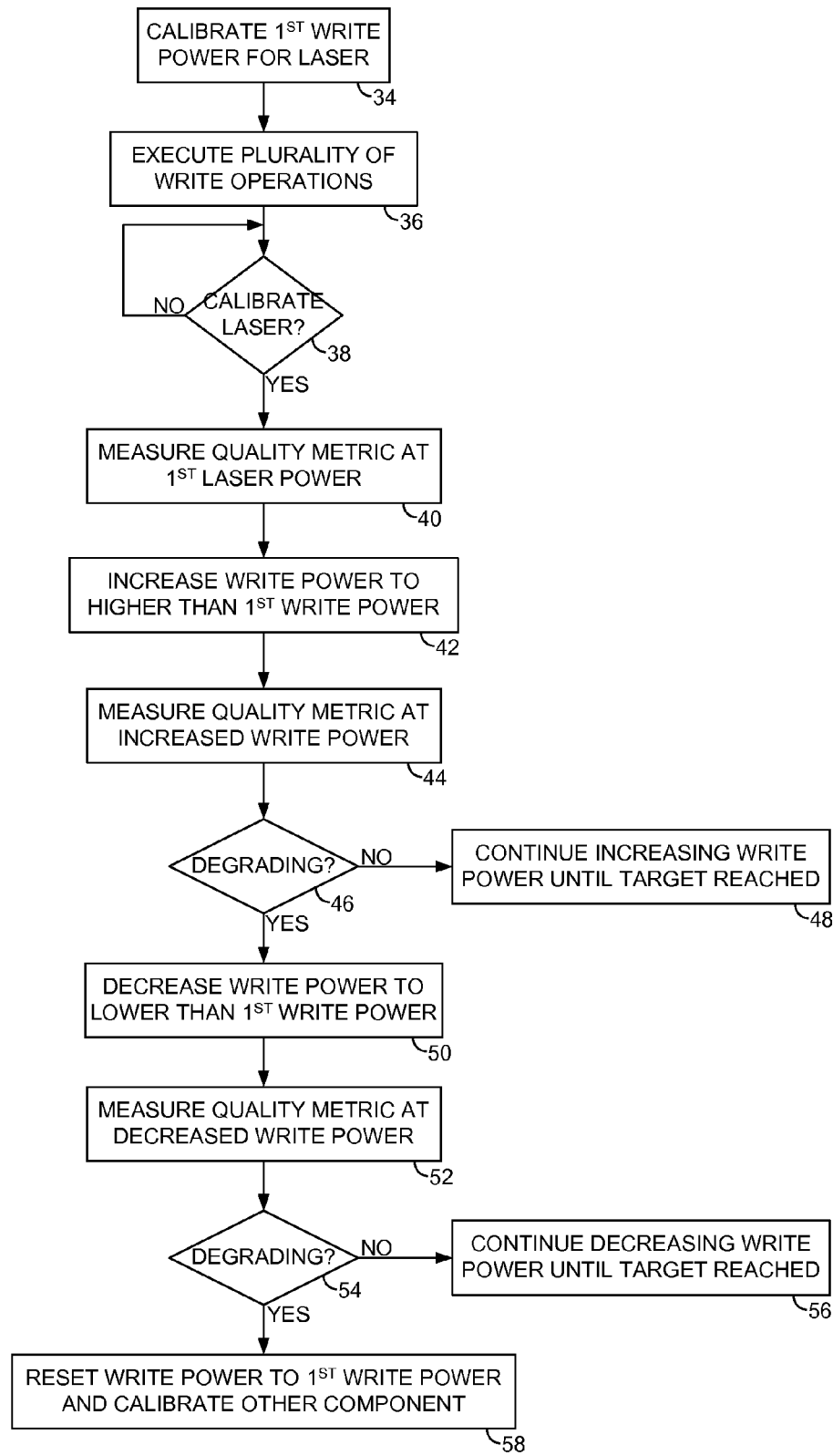
FIG. 6 is a flow diagram according to an embodiment of the present invention wherein when calibrating the write power for the laser, a range of settings are tested around the current setting.

FIG. 6 is a flow diagram according to an embodiment of the present invention for recalibrating the laser write power at the end of the calibration interval which is described with reference to FIG. 7. After calibrating a first write power (step 34) and executing a plurality of write operations using the first write power, the write power is recalibrated at the end of the calibration interval (step 38). A quality metric is measured at the first write power (step 40), such as by writing and reading a test pattern from the disk. The write power is then increased to higher than the first write power (step 42) and the quality metric measured at the increased write power (step 44). If the recording quality is improving at the increased write power based on the quality metric (step 46), then the write power is increased incrementally until the quality metric reaches a target value (step 48).

If the quality metric indicates the recording quality is degrading at the higher write power (step 46), the write power is decreased to lower than the first write power (step 50) and the quality metric measured at the decreased write power (step 52). If the recording quality is improving at the decreased write power based on the quality metric (step 54), then the write power is decreased incrementally until the quality metric reaches a target value (step 56).

If the quality metric indicates the recording quality is degrading at the lower write power (step 54), it is assumed that the write power did not need recalibrating, therefore the write power is reset to the first write power (step 58). If the quality metric is below a threshold, indicating poor recording quality, a different component may be calibrated (step 58). For example, in one embodiment a poor quality metric may trigger the recalibration of the laser write power, but if the calibration procedure indicates the current write power is already optimal, the control circuitry may attempt to calibrate a different component that may be the cause of the poor recording quality (e.g., write current amplitude, or a read channel component).

Figure 7:
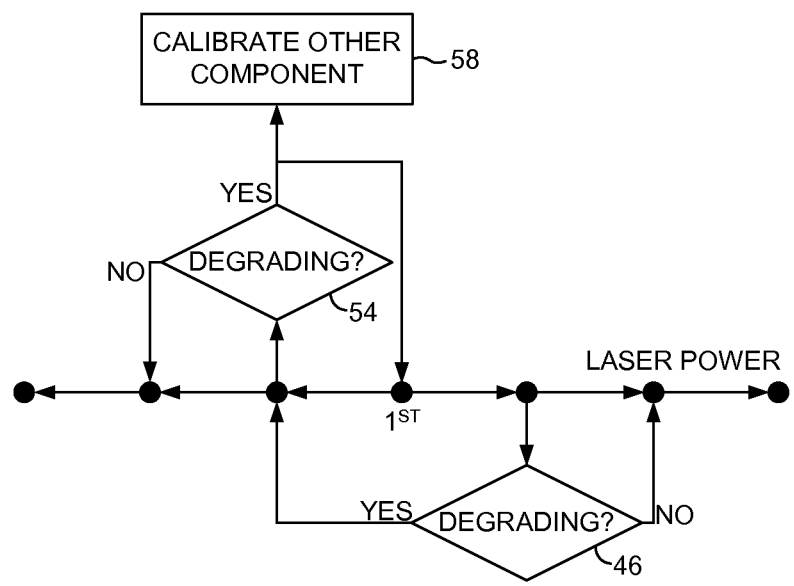
FIG. 7 illustrates an embodiment of the present invention wherein if adjusting the write power for the laser does not improve performance, the write power is reset and another component is calibrated.

In the embodiment of FIG. 6 and FIG. 7, the write power is initially increased from the current setting during a recalibration since it is assumed that the laser output is degrading over the calibration interval. In this manner, the time to perform the recalibration procedure is typically minimized since most of the time the laser write power will need to be incremented a few settings from the current setting. However, when this assumption is incorrect, the correct write power is typically a few decrements below the current setting. Accordingly, the recalibration time is minimized by testing only a few settings around the current setting rather than testing a full range of settings (e.g., by starting with a low power setting and incrementing until the quality metric reaches the target).

In one embodiment, the nominal performance characteristics for the laser are predetermined, for example, by evaluating performance data provided by the laser manufacturer. Alternatively, the nominal performance characteristic may be determined by performing bench mark testing of a number of lasers, and in another embodiment the performance characteristics may be saved by each individual disk drive while deployed in the field and transmitted to the disk drive manufacturer (e.g., over the Internet or when returned for service). The performance characteristics of the laser may then be used to optimize the calibration interval profile for a family of disk drives. That is, as each new disk drive is manufactured, it may be configured with a calibration interval profile based on the nominal performance characteristics for the laser.

In one embodiment, the calibration interval profile may be adjusted within each disk drive based on the actual performance characteristics measured for the laser while deployed in the field. For example, the control circuitry may measure the performance characteristics of the laser and modify the algorithm for biasing the adjustment to the calibration interval based on general degradation over time, the ambient temperature, and/or the quality metrics as described above. In one embodiment, the performance characteristics of the laser are determined based on the amount of adjustment needed to the write power during the recalibration procedure. If the write power requires a large adjustment when recalibrated, the algorithms for adjusting the calibration interval may be modified to decrease the calibration interval faster (so the write power is calibrated sooner). Conversely, the algorithms may be modified to decrease the calibration interval slower if the write power requires only a minor adjustment when recalibrated at the end of the current calibration interval.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
    a disk;
    a head actuated over the disk, wherein the head comprises a laser for heating the disk while writing data to the disk; and
    control circuitry operable to:
        receive write commands;
        increase a power of the laser to a write power for heating the disk while writing data to the disk;
        measure a duration that the power is applied to the laser;
        adjust a calibration interval based on the duration; and
        calibrate the write power at the calibration interval.

2. The disk drive as recited in claim 1, wherein the control circuitry is further operable to decrease the calibration interval over time to compensate for the laser degrading.

3. The disk drive as recited in claim 1, wherein the control circuitry is further operable to adjust the calibration interval based on the power applied to the laser and an ambient temperature over time.

4. The disk drive as recited in claim 3, wherein the control circuitry is operable to decrease the calibration interval as the ambient temperature increases.

5. The disk drive as recited in claim 1, wherein the control circuitry is further operable to adjust the calibration interval based on the power applied to the laser and a quality metric for data read from the disk over time.

6. The disk drive as recited in claim 5, wherein the quality metric comprises an error rate of the data read from the disk.

7. The disk drive as recited in claim 5, wherein the quality metric comprises a read channel quality metric.

8. The disk drive as recited in claim 5, wherein the control circuitry is further operable to bias the quality metric based on a calibration timer for timing the calibration interval.

9. A disk drive comprising:
    a disk;
    a head actuated over the disk, wherein the head comprises a laser for heating the disk while writing data to the disk; and
    control circuitry operable to:
        calibrate a first write power for the laser;
        execute a plurality of write operations using the first write power;
        after executing the plurality of write operations, recalibrate the write power for the laser by:
            increasing the write power to higher than the first write power and measuring a quality metric; and
            when the quality metric indicates degrading performance at the higher write power, decreasing the write power to lower than the first write power; and
        when the quality metric indicates degrading performance at the lower write power, reset the write power to the first write power, and calibrate at least one other component of the disk drive.

10. The disk drive as recited in claim 9, wherein the control circuitry is further operable to calibrate the write power for the laser by:
    writing a test pattern to the disk; and
    measuring the quality metric by reading the test pattern from the disk.

11. A method of operating a disk drive, the disk drive comprising a head actuated over a disk, wherein the head comprises a laser for heating the disk while writing data to the disk, the method comprising:
    receiving write commands;
    increasing a power of the laser to a write power for heating the disk while writing data to the disk;
    measuring a duration that the power is applied to the laser;
    adjusting a calibration interval based on the duration; and
    calibrating the write power at the calibration interval.

12. The method as recited in claim 11, further comprising decreasing the calibration interval over time to compensate for the laser degrading.

13. The method as recited in claim 11, further comprising adjusting the calibration interval based on the power applied to the laser and an ambient temperature over time.

14. The method as recited in claim 13, further comprising decreasing the calibration interval as the ambient temperature increases.

15. The method as recited in claim 11, further comprising adjusting the calibration interval based on the power applied to the laser and a quality metric for data read from the disk over time.

16. The method as recited in claim 15, wherein the quality metric comprises an error rate of the data read from the disk.

17. The method as recited in claim 15, wherein the quality metric comprises a read channel quality metric.

18. The method as recited in claim 15, further comprising biasing the quality metric based on a calibration timer for timing the calibration interval.

19. A method of operating a disk drive, the disk drive comprising a head actuated over a disk, wherein the head comprises a laser for heating the disk while writing data to the disk, the method comprising:
    calibrating a first write power for the laser;
    executing a plurality of write operations using the first write power;
    after executing the plurality of write operations, recalibrating the write power for the laser by:
        increasing the write power to higher than the first write power and measuring a quality metric; and when the quality metric indicates degrading performance at the higher write power, decreasing the write power to lower than the first write power; and when the quality metric indicates degrading performance at the lower write power, resetting the write power to the first write power, and calibrating at least one other component of the disk drive.

20. The method as recited in claim 19, further comprising calibrating the write power for the laser by:

writing a test pattern to the disk; and measuring the quality metric by reading the test pattern from the disk.

* * * * *